(12) United States Patent
Barthel et al.

(10) Patent No.: US 8,257,674 B2
(45) Date of Patent: Sep. 4, 2012

(54) PARTICLES HAVING A SMALL SPECIFIC SURFACE AND A GREAT THICKENING EFFECT

(75) Inventors: Herbert Barthel, Emmerting (DE); Helmut Maginot, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 653 days.

(21) Appl. No.: 11/816,454

(22) PCT Filed: Feb. 9, 2006

(86) PCT No.: PCT/EP2006/001154
§ 371 (c)(1),
(2), (4) Date: Aug. 16, 2007

(87) PCT Pub. No.: WO2006/087136
PCT Pub. Date: Aug. 24, 2006

(65) Prior Publication Data
US 2008/0141904 A1    Jun. 19, 2008

(30) Foreign Application Priority Data
Feb. 18, 2005  (DE) .................. 10 2005 007 753

(51) Int. Cl.
*C01B 33/12* (2006.01)
*C04B 14/00* (2006.01)
(52) U.S. Cl. .................. 423/335; 423/337; 106/400
(58) Field of Classification Search .................. 423/335, 423/336, 402, 337; 106/400; 428/405, 406; 516/86
See application file for complete search history.

(56) References Cited

U.S. PATENT DOCUMENTS

| | | | |
|---|---|---|---|
| 4,565,682 A | 1/1986 | Loskot et al. | |
| 4,649,037 A | 3/1987 | Marsh et al. | |
| 5,686,054 A | 11/1997 | Barthel et al. | |
| 5,851,715 A | 12/1998 | Barthel et al. | |
| 6,800,413 B2 | 10/2004 | Barthel et al. | |
| 6,887,518 B2 | 5/2005 | Barthel et al. | |
| 7,439,298 B2 * | 10/2008 | Schumacher et al. | 524/588 |
| 7,491,375 B2 * | 2/2009 | Schumacher et al. | 423/335 |
| 2002/0132119 A1 | 9/2002 | Kirkland et al. | |
| 2003/0099895 A1 | 5/2003 | Barthel et al. | |
| 2003/0100631 A1 | 5/2003 | Barthel et al. | |
| 2003/0138715 A1 | 7/2003 | Barthel et al. | |
| 2004/0131527 A1 | 7/2004 | Gottschalk-Gaudig et al. | |

FOREIGN PATENT DOCUMENTS

| | | |
|---|---|---|
| CN | 1405084 A | 3/2003 |
| DE | 101 45 162 A1 | 4/2003 |
| DE | 101 50 274 A1 | 4/2003 |
| EP | 0 097 378 A | 1/1984 |
| EP | 0 686 679 A1 | 12/1995 |
| EP | 1 302 444 A | 4/2003 |
| EP | 1 304 332 A1 | 4/2003 |
| EP | 1 433 749 A1 | 6/2004 |
| JP | 61-232204 A | 10/1986 |
| JP | 07-010524 A | 1/1995 |
| JP | 2001-179088 A | 7/2001 |

OTHER PUBLICATIONS

English PatBase Abstract corresponding to DE 101 45 162 A1.
English PatBase Abstract corresponding to DE 101 50 274 A1.
English PatBase Abstract corresponding to EP 0 686 679 A1.
English PatBase Abstract corresponding to EP 1 433 749 A1.
English PatBase Abstract corresponding to DE 1304332 A.
Conder et al.: "Physico-Chemical Measurement by Gas Chromatograhpy", Wiley, New York, 1979.
Gregg et al.: Adsorption, Surface Area and Porosity, 2nd edition, Academic Press, London, 1982.
Barthel et al.: "Organosilicon Chemistry II, From Molecules to Materials", 1996, Wiley VCH, Weinheim, pp. 761-778, XP 002428170.
Mathias et al.: "Basic Characteristics and Applications of Aerosil : 30. The Chemistry and Physics of the Aerosil Surface", J. Colloid and Interface Sci., vol. 125, No. 1, 19.
Nippon Aerosil Co., Ltd., Technical Bulletin Aerosil, Mar. 3, 1984, No. 5, pp. 2-32.

* cited by examiner

*Primary Examiner* — Roy King
*Assistant Examiner* — Carlos Barcena
(74) *Attorney, Agent, or Firm* — Brooks Kushman P.C.

(57) ABSTRACT

Particles having a relative viscosity or thickening effect $\eta_{rel}$ of more than 2, measured in a liquid medium having a viscosity of 1 Pas at a temperature of 25° C. and measured at a shear gradient of 10 s$^{-1}$. The particles can form beds having a porosity $\epsilon > 0.5$ in a dry form.

21 Claims, 1 Drawing Sheet

PARTICLES HAVING A SMALL SPECIFIC SURFACE AND A GREAT THICKENING EFFECT

CROSS-REFERENCE TO RELATED APPLICATION

This application is the U.S. national phase of PCT Appln. No. PCT/EP2006/001154 filed Feb. 9, 2006 which claims priority to German application 10 2005 007 753.6 filed Feb. 18, 2005.

BACKGROUND OF THE INVENTION

1. Field of the Invention

The invention relates to particles and their uses.

2. Description of the Related Art

The preparation of metal oxides, silicon dioxides and silicas in wet-chemical precipitation processes and high-temperature reactions is known.

A disadvantage of known processes for preparing fumed silicas is the correlation between the specific area of the silica and the relative viscosity or thickening action $\eta_{rel}$ in liquid media.

$$\eta_{rel} = \eta/\eta_0$$

In this formula, $\eta$ is the viscosity at 25° C. of the liquid, of the liquid mixture or of any other liquid mixtures which comprise inventive particles, preferably silica, in finely distributed and dispersed form, and $\eta_0$ is the viscosity at 25° C. of the liquid, of the liquid mixture or of any other liquid mixture which does not comprise these particles or silica.

The correlation between relative viscosity or thickening action $\eta_{rel}$ and specific surface area limits the scope of use of non-surface-modified and surface-modified silicas greatly.

SUMMARY OF THE INVENTION

In order to open up new fields of use for silica, it is an object of the invention to improve upon the prior art and especially to develop particles, preferably silica, more preferably fumed silica, which have higher thickening action. These and other objects are achieved by the invention, which provides particles having a thickening action $\eta_{rel}$ of greater than 2.

DETAILED DESCRIPTION OF THE PREFERRED EMBODIMENTS

The invention thus provides particles having a relative viscosity or thickening action $\eta_{rel}$ greater than 2, measured in a liquid medium with a viscosity of 1 Pas at a temperature of 25° C. and measured at a shear rate of 10 s$^{-1}$, and which, in dry form, are capable of forming accumulations with a porosity $\epsilon$ of >0.5.

In a preferred embodiment, the specific surface area S-spec is measured as the BET surface area by means of nitrogen S-BET-N$_2$ at the boiling point of the liquid nitrogen, preferably according to German Industrial Standard DIN 66131 and DIN 66132.

In another preferred embodiment, the specific surface area S-spec is determined via the specific water surface area S-BET-H$_2$O, which is calculated in turn from the monolayer capacity N—H$_2$O of the particles, preferably silica, more preferably fumed silica, for water, multiplied by a factor K. For fumed silica, this factor can be obtained empirically by comparing the BET surface area determined by means of nitrogen S-BET-N$_2$ and specific water surface area S-BET-H$_2$O, as K equals the nitrogen BET surface area S-BET-N$_2$ divided by specific water surface area S-BET-H$_2$O. This factor K is preferably greater than 2 and less than 4, more preferably 3.

$$\text{S-spec} = \text{S-BET-H}_2\text{O}*3$$

and $$\text{S-BET-H}_2\text{O} = \text{N-H}_2\text{O}*a\text{-H}_2\text{O}$$

where $a$-H$_2$O is the molecular area of water:

$$a\text{-H}_2\text{O} = 11.9 \text{ Å}^2 (1\text{Å} = 0.1 \text{ nm} = 10^{-10}\text{m})$$

Preference is given to determining the specific water absorption by means of inverse gas chromatography (IGC) as IGC at finite concentration (IGC-FC) from water desorption isotherms, preferably at a temperature of greater than 20° C. and less than 60° C., more preferably at a temperature of 40° C., and most preferably at a temperature of 30° C.

The adsorption isotherm can be calculated from a single gas chromatography peak [J. R. Conder, C. L. Young, Physico-Chemical Measurement by Gas Chromatography. Wiley, N.Y., 1979], as described in FIG. 1, for example for relative vapor pressures P/P0 of from close to 0 to 0.3 wherein height of the point 2 of isotherm 1 is proportional to the pressure p and the surface area of the silica is proportional amount of water absorbed.

Figure 1:
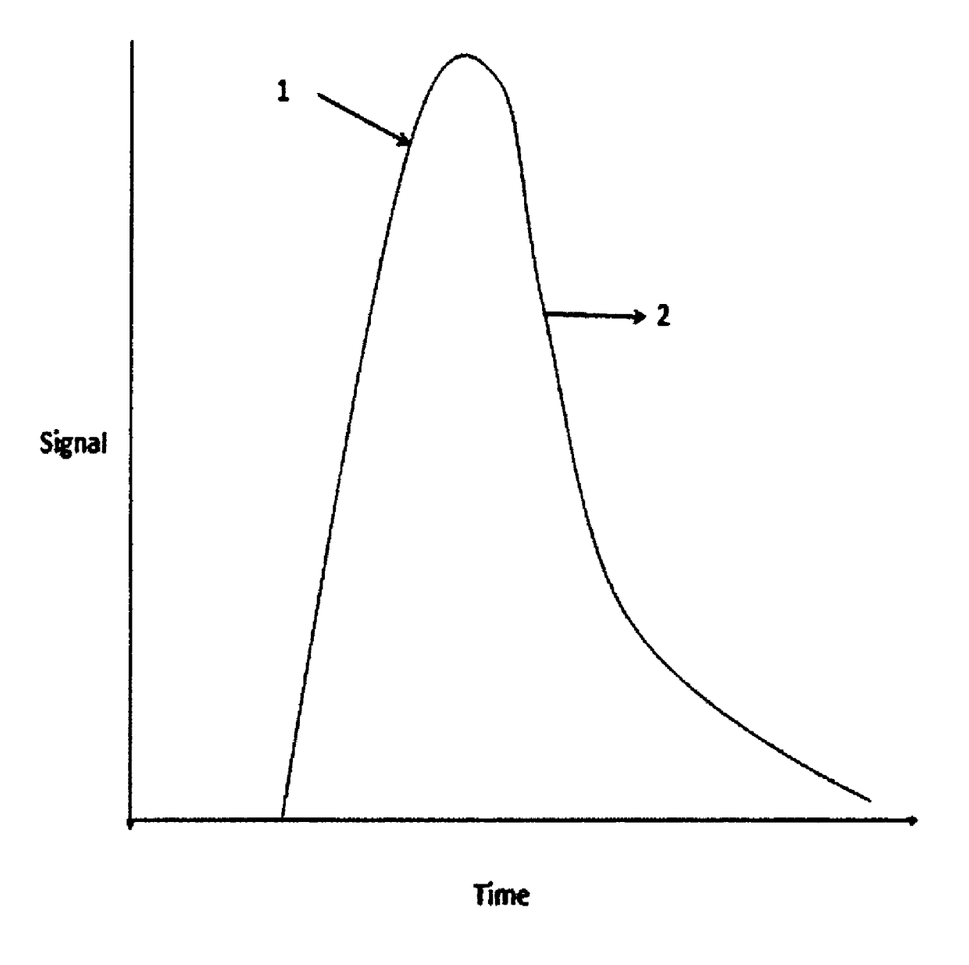
FIG. 1 illustrates the principle of determining a point of the adsorption isotherm at relative vapor pressures p/p0 in the range of 0.01<p/p0<0.3.

The following information is obtained from the isotherm:

The specific surface area of the samples: the part of the isotherm between relative vapor pressures of 0.05<p/p0<0.3 permits the calculation of the specific BET surface area S-BET-H$_2$O and the BET constant C-BET-H$_2$O, which is a measure of the adsorption energy of water onto the particles, preferably silica, most preferably fumed silica.

IGC-FC directly provides the first derivative of the isotherm by using the following relationship:

$$\left(\frac{\partial N}{\partial P}\right)_{L,R} = \frac{1}{RT}\frac{D_c}{m}(t_R - t_0)$$

where:

L is the length of the GC column, N is the number of molecules at a given point in the GC peak, P is the adsorption pressure, $t_R$ is the retention time of the sample injected, $t_0$ is the retention time of an (almost) unadsorbed sample, for example air, which allows the dead time $t_r$ of the GC column to be determined. $D_c$ is the corrected gas flow and m the mass of the solid in the column.

Peaks which are obtained from the injection of water can be evaluated using the ECP procedure (Elution at the Characteristic Point) [J. R. Conder, C. L. Young, Physico-Chemical Measurement by Gas Chromatography. Wiley, New York, 1979] to calculate the isotherm.

The isotherm is evaluated in a range of relative vapor pressure of $$0.01 < P/P < 0.25$$

This region of the isotherm is evaluated by the BET algorithm [S. J. Gregg, K. S. W. Sing, Adsorption, Surface Area and Porosity, second edition, Academic Press, London, 1982];

what is obtained is the specific BET surface area S-BET-H$_2$O, assuming the molecular area of water of 11.9 Å$^2$ (1 Å=0.1 nm=10$^{10}$ m).

The relative viscosity or thickening action of the particles, preferably silica, is determined as follows. The relative viscosity or thickening action of the particles, preferably silica, is calculated as the quotient of the viscosity η and the particle-free viscosity η$_0$.

$$\eta_{rel} = \eta/\eta_0$$

In this formula, η is the viscosity at 25° C. of the liquid, of the liquid mixture or of any other liquid mixtures which comprise inventive particles, preferably silica, in finely distributed and dispersed form, and η$_0$ is the particle-free viscosity at 25° C. of the liquid, of the liquid mixture or of any other liquid mixture which does not comprise these particles or silica.

Suitable test methods for determining the primary particle diameter are, for example, the determination of the BET surface areas S-BET, preferably S-BET-N$_2$, preferably measured according to German Industrial Standard DIN 66131 and DIN 66132, and the material density ρ-PP:

$$d\text{-PP} = 6/(S\text{-BET} * \rho\text{-PP})$$

where, for example, the material density ρ-PP of amorphous silica, such as fumed silica, has a value of 2200 g/l.

Other suitable test methods for determining the primary particle diameter are, for example, transmission electron microscopy or high-resolution scanning electron microscopy, for example in the field emission mode, or, for example, ultrasound spectroscopy in the measurement region from 1 to 100 MHz.

Inventive particles preferably have a mean diameter of less than 100 μm. The inventive particles preferably have a mean diameter greater than 1 nm, more referably from 1 nm to 100 μm, yet more preferably from 10 nm to 10 μm, in particular from 50 nm to 1000 nm, and especially from 50 nm to 250 nm.

The inventive particles are preferably particles solid at room temperature and the pressure of the surrounding atmosphere, i.e. between 900 and 1100 hPa, and are preferably insoluble or sparingly soluble in water or in other inert solvents.

The inventive particles, preferably silica, more preferably fumed silica, preferably have a solubility in water at pH 7.33, an electrolyte background of 0.11 mol/l, and a temperature of 37° C., of less than 0.1 g/l, more preferably less than 0.05 g/l, at the pressure of the surrounding atmosphere, i.e. between 900 and 1100 hPa.

The inventive particles, preferably silica, more preferably fumed silica, preferably have a molar mass greater than 10,000 g/mol, more preferably a molar mass of from 50,000 to 100,000,000 g/mol, and in particular from 100,000 to 10,000,000 g/mol, in each case measured preferably by means of static light scattering.

The inventive particles preferably have a carbon content of less than 50 percent by weight, more preferably less than 1 percent by weight, yet more preferably less than or equal to 0.05 percent by weight, and most preferably less than or equal to 0.01 percent by weight. The carbon content of the particles can be measured by known methods of elemental analysis. In an especially preferred embodiment, the particles do not have a carbon content measurable by elemental analysis.

The inventive particles preferably have a Mohs hardness less than or equal to 1. The particles used in accordance with the invention more preferably have a Mohs hardness of greater than 4.

Inventive particles preferably consist of metal oxides, for examples oxides of main group III, such as aluminum oxides, of main group IV, such as silicon dioxide, germanium oxide, and of main group V, and, for example, oxides of the transition group metals, such as titanium(IV) dioxides, zirconium(IV) oxides, zinc oxides, and, for example, oxides of lanthanides such as cerium(IV) oxides; and any mixtures of these oxides such as silicon dioxide-aluminum oxide mixed oxides with any composition, preferably those having a content of from 20 to 100% by weight of silicon dioxide; silicon dioxide-iron (III) oxide mixed oxides with any composition, preferably those having a content of from 20 to 100% by weight of silicon dioxide; and silicon dioxide-titanium(IV) oxide mixed oxides with any composition, preferably those having a content of from 20 to 100% by weight of silicon dioxide.

Preference is given to metal oxides with specific BET surface areas of greater than 10 m$^2$/g, such as metal oxides produced in high-temperature processes, such as pyrogenic metal oxides produced in flame processes, metal oxides produced in plasma processes, metal oxides produced in hot-wall reactors and metal oxides produced by laser processes. Specific surface area is preferably measured as the BET surface area to German Industrial Standard DIN 66131 and DIN 63132.

Preference is given to silicas with specific BET surface areas of greater than 10 m$^2$/g, more preferably synthetic silicas, for example wet-chemically produced silicas such as silica sols and silica gels, fumed silicas produced in flame processes such as silicon dioxides produced in plasma processes, silicon dioxides produced in hot wall reactors, silicon dioxides produced in laser processes, more preferably fumed silica produced at preferred temperatures of over 1000° C. Preference us given to measuring the specific surface area as the BET surface area measured according to German Industrial Standard DIN 66131 and DIN 66132.

The inventive particles preferably have a mean primary particle size d-PP of from 0.5 to 1000 nm, preferably from 5 to 100 nm, more preferably from 5 to 50 nm.

The inventive particles preferably have a mean secondary structure or aggregate particle size d-Aggr of from 50 to 5000 nm, preferably from 100 to 500 nm, measured as the hydrodynamic diameter.

Suitable measuring processes for this purpose are, for example, dynamic light scattering or photocorrelation spectroscopy, for the measurement of concentrations of >0.01% by weight of solid, this measurement being performed as back-scattering and being correctable by means of cross-correlation against multiple scattering.

The inventive particles preferably have a mean tertiary or agglomerate particle size d-Aggl of >100 nm, measured as the geometric diameter.

Suitable measurement processes for this purpose are, for example, laser light diffraction.

The inventive particles preferably have a specific surface area of from 1 to 1000 m$^2$/g, preferably from 10 to 500 m$^2$/g, most preferably from 75 to 350 m$^2$/g. The BET surface area is measured by known processes, preferably to German Industrial Standard 66131 and DIN 66132.

The inventive particles preferably have a fractal dimension of the surface area D$_s$ of preferably less than or equal to 2.3, preferentially of less than or equal to 2.1, more preferably of from 1.95 to 2.05, where the fractal dimension of the surface area D$_s$ is defined here as: particle surface area A is proportional to the particle radius R to the power of D$_s$.

$$A = \text{constant-}1 * R^{D_s}$$

The inventive particles preferably have a fractal dimension of the mass $D_m$ of preferably less than or equal to 2.8, preferentially equal to or less than 2.5, more preferably less than 2.2, with emphasis of less than 2.0. The fractal dimension of the mass $D_m$ is defined here as: particle mass M is proportional to the particle radius R to the power of $D_m$.

$$M = \text{constant-2} * R^{Dm}$$

Preferred particles are hydrophilic silicas which have been freshly produced and come, for example, directly from the flame, and those which have been stored intermediately or already packaged in a commercially customary manner. Particles may also be hydrophobized or silylated silicas, for example commercially available silicas.

Particles are preferably uncompacted silicas preferably with tapped densities of less than 60 g/l, but also compacted silicas having tapped densities of greater than 60 g/l, preferably fumed silicas. The tapped density can be determined to DIN EN ISO 787-11.

Particles may preferably be mixtures of different silicas, for examples mixtures of silicas of different BET surface area, or mixtures of silicas with different degrees of hydrophobization or silylation.

In a further embodiment, the particles are hydrophobic particles, in which case the surface-modified metal oxides are preferably silylated metal oxides modified with organosilicon compounds; very particular preference is given to silylated fumed silicas, as described, for example, in EP 686 676 A or U.S. Pat. Nos. 5,686,054 and 5,851,715; DE 10145162 A or U.S. Pat. No. 6,800,413; DE 10150274 A or US 2003-0100631 A; DE 1304332 A or US 2003-0099895 A; EP 1433749 A or US 2004-0131527 A.

When the particles are silicon dioxide particles, preference is given to those which have a density of surface silanol groups SiOH of preferably less than 2.5 $SiOH/nm^2$, preferably less than 2.0 $SiOH/nm^2$, more preferably of less than 1.5 $SiOH/nm^2$, even more preferably of less than 1 $SiOH/nm^2$, with emphasis of less than 0.5 $SiOH/nm^2$.

Particular preference is given to hydrophilic, non-surface-modified fumed silicas which preferably have a density of surface silanol groups SiOH of less than 2.5 $SiOH/nm^2$, preferably less than or equal to 2.0 $SiOH/nm^2$.

Preference is given to particles which, preferably in dry form, are capable of forming accumulations, shaped bodies or coatings with preferably a porosity $\epsilon$ of $>0.5$, preferably $\epsilon>0.8$, more preferably $\epsilon>0.9$, most preferably $\epsilon>0.95$.

The porosity of an accumulation, shaped body or of a coating is defined here as $$\epsilon = 1 - \text{volume}_{material}/\text{volume}_{body}$$

where
$\text{volume}_{material}$ = volume of the particles
and
$\text{volume}_{body}$ = volume of the accumulation, shaped body or coating.

The porosity $\epsilon$ can be determined by mercury porosimetry or by pycnometry or by means of inert gases such as helium or argon, by measuring the empty volume $\text{volume}_{empty}$ of the accumulation, of the shaped body or of the coating, where $$\epsilon = \text{volume}_{empty}/\text{volume}_{body}$$

In another preferred embodiment, the porosity $\epsilon$ can be determined by measuring the volume $\text{volume}_{body}$ of the preferably dry accumulation, shaped body or coating, and measuring the mass $\text{mass}_{body}$ of the preferably dry accumulation, shaped body or coating, and a suitable determination of the material density $\rho$-PP of the particles.

$$\epsilon = (\text{mass}_{body}/\text{volume}_{body})/\rho\text{-PP}$$

The porosity $\epsilon$ of the preferably dry accumulation can be determined as the quotient between the specific density of the body or accumulation $\text{density}_{body}$ and the material density $\rho$-PP of the primary particles.

$$\epsilon = \text{density}_{body}/\rho\text{- PP}$$

The specific density of the body or accumulation $\text{density}_{body}$ can be determined, for example, as the tapped density to DIN EN ISO 787-11.

According to the invention, the particles, preferably silica, more preferably fumed silica, most preferably hydrophilic fumed silica, preferably have a surface-specific water absorption N-spec-$H_2O$ of less than 5 micromoles per square meter [$\mu mol/m^2$], more preferably less than 4 $\mu mol/m^2$, more preferably less than 3 $\mu mol/m^2$, most preferably less than 2.5 $\mu mol/m^2$, where the specific water absorption N-spec-$H_2O$ is defined as $$\text{N-spec-}H_2O = \text{N---}H_2O/\text{S-BET-}N_2$$

where
N---$H_2O$ is the monolayer capacity of the particles, preferably silica, more preferably fumed silica, for water ($H_2O$), which can preferably be determined as described above by inverse gas chromatography at finite concentration (IGC-FC), and S-BET-$N_2$ is the specific BET surface area determined by means of adsorption of nitrogen ($N_2$), which can be measured by known processes, preferably to German Industrial Standard DIN 66131 and DIN 66132.

In a preferred inventive embodiment, the particles, preferably silica, more preferably fumed silica, most preferably hydrophilic fumed silica, preferably have a surface-specific water absorption N-spec-$H_2O$ (30° C.) at a temperature of 30° C. of less than 5 micromoles per square meter [$\mu mol/m^2$], more preferably less than 4 $\mu mol/m^2$, yet more preferably less than 3 $\mu mol/m^2$, and most preferably less than 2.5 $\mu mol/m^2$, where the specific water absorption N-spec-$H_2O$ (30° C.) is defined as $$\text{N-spec-}H_2O(30°\text{ C.}) = (\text{N---}H_2O)(30°\text{ C.})/\text{S-BET-}N_2$$

where
N---$H_2O$ (30° C.) is the monolayer capacity of the particles, preferably silica, more preferably fumed silica, most preferably hydrophilic fumed silica, for water ($H_2O$) at a temperature of 30° C., which can preferably be determined as described above by inverse gas chromatography at finite concentration (IGC-FC), and S-BET-$N_2$ is the specific BET surface area determined by means of adsorption of nitrogen ($N_2$), which can be measured by known processes, preferably to German Industrial Standard DIN 66131 and DIN 66132.

According to the invention, the inventive silica preferably has a very homogeneous particle structure, characterized by a narrow primary particle diameter distribution.

The inventive particles, preferably silica, have a homogeneous, i.e. a preferably narrow, primary particle diameter distribution, especially a homogeneous surface-specific primary particle diameter distribution.

The homogeneous surface-specific primary particle diameter distribution is preferably characterized by a primary particle diameter distribution range b-PP of less than 6, more preferably less than 5, yet more preferably less than 4, even more preferably less than 3, and especially selected from less than 2, where the primary particle diameter distribution range b-PP is defined as the quotient of the maximum primary particle diameter, for example determined by means of transmission electron microscopy (TEM) d-PP-TEM-max and the mean primary particle diameter d-PP-BET calculated from the specific BET surface area S-BET-$N_2$ $$d\text{-PP-BET}=6/(\text{S-BET-}N_2*2{,}200{,}000 \text{ g/m}^3)$$

$$b\text{-PP}=d\text{-PP-TEM-max}/d\text{-PP-BET}$$

The homogeneous surface-specific primary particle distribution is preferably determined by means of transmission electron microscopy (TEM) with a magnification of greater than 50,000, preferably greater than 100,000, and manual or semi-automatic or fully automatic digitalized evaluation of the TEM images in a format viewable in analog form on paper, photographic paper, or in analog or digital form on a screen, or in a format stored in digital form on a data carrier, and available for processing.

In another preferred embodiment, the homogeneous surface-specific primary particle diameter distribution can be determined by means of gas adsorption of nitrogen at the temperature of nitrogen boiling at standard pressure, and evaluating the adsorption isotherm according to Gun'ko; see also V. Gun'ko and H. Barthel, to be published in 2006.

The primary particle size is determined by the flame temperature. The specific BET surface area S-BET-$N_2$, which constitutes a reciprocal measure of the mean primary particle diameter d-PP-BET, is determined by the mean temperature. According to the invention, the distribution of the primary particle diameter distribution is determined by the local distribution of the temperature in the reactor and the residence time distribution of the silica particles. According to the invention, a highly homogeneous local distribution of the temperature is realized in the reactor, and also a homogeneous distribution of the temperature with time.

According to the invention, the particles, preferably silica, preferentially fumed silica, exhibit a high thickening action $\eta_{rel}$ owing to a highly homogeneous temperature distribution in the reactor for the reparation.

The particles, preferably fumed silica, preferably exhibit a relative viscosity or thickening action $\eta_{rel}$ of preferably greater than 2, more preferably greater than 3.5, yet more preferably greater than 5, even more preferably greater than 6.5, and especially greater than 7.5, measured in a liquid medium having a viscosity of 1 Pas at a temperature of 25° C. and measured at a shear rate of 10 s$^{-1}$.

The measurement of the thickening action $\eta_{rel}$ is preferably performed at a content of particles, preferably silica, more preferably fumed silica, of greater than or equal to 1 percent by weight, more preferably of greater than or equal to 1.5 percent by weight, yet more preferably of greater than or equal to 2 percent by weight, and especially of greater than or equal to 2.5 percent by weight, in a liquid medium.

Inventive particles, preferably silica, more preferably fumed silica, characterized in that they preferably have a surface-specific thickening action $\eta_{rel}$-SF of greater than 0.01, more preferably greater than 0.02, yet more preferably of greater than 0.024, most preferably of greater than 0.030, and especially greater than 0.035. In a particularly preferred embodiment, the silica, more preferably fumed silica, preferably has a surface-specific thickening action $\eta_{rel}$-SF of greater than 0.04 gram per square meter (g/m$^2$), most preferably of greater than 0.05 g/m$^2$.

The surface-specific thickening action $\eta_{rel}$-SF is defined here as the quotient of the relative viscosity in a liquid system or thickening action $\eta_{rel}$ and the specific surface area S-spec.

$$\eta_{rel}\text{-SF}=\eta_{rel}/\text{S-spec}$$

where the relative viscosity or thickening action $\eta_{rel}$, as described below, preferably has a relative viscosity in a polydimethylsiloxane with viscosity 1 Pas at 25° C. $\eta_{rel}^{PDMS-1000}$ and at a content of 2 percent by weight of silica, preferably fumed silica.

S-spec, as described above, is preferably the specific BET surface area S-BET-$N_2$, which can be measured by known processes, preferably to German Industrial Standard DIN 66131 and DIN 66132.

According to the invention, the inventive particles, preferably inventive silica, more preferably fumed silica, and especially hydrophilic fumed silica, exhibit a high relative viscosity or thickening action $\eta_{rel}$ in liquid media and at the same time a low water absorption.

According to the invention, the silica, preferably fumed silica, especially hydrophilic fumed silica, preferably has a water absorption-specific thickening action $\eta_{rel}$-spec-$H_2O$ of greater than 0.02 m$^2$/μmol, more preferably greater than 0.05 m$^2$/μmol, more preferably greater than 0.75 m$^2$/μmol, even more preferably greater than 1.0 m$^2$/μmol, and especially greater than or equal to 1.5 m$^2$/μmol, where the water absorption-specific thickening action $\eta_{rel}$-spec-$H_2O$ is defined as the quotient of the relative viscosity $\eta_{rel}$ and the specific water absorption N-spec-$H_2O$ of the silica, preferably fumed silica.

$$\eta_{rel}\text{-}H_2O=\eta_{rel}/\text{N-spec-}H_2O$$

where the specific water absorption N-spec-$H_2O$ is preferably determined as the specific water absorption N-spec-$H_2O$ (30° C.) at a temperature of 30° C. as described above.

In an embodiment preferred in accordance with the invention, the silica, preferably fumed silica, most preferably hydrophilic fumed silica, has a water absorption-based thickening action $\eta_{rel}$-$H_2O$ (30° C.) of greater than 0.004 g/μmol, preferably greater than 0.006 g/μmol, more preferably greater than or equal to 0.008 g/μmol, even more preferably greater than or equal to 0.01 g/μmol and especially greater than or equal to 0.015 g/μmol.

Where the water absorption-based thickening action $\eta_{rel}$-$H_2O$ (30° C.) is defined as the quotient of the relative viscosity $\eta_{rel}$ and the monolayer capacity of water N—$H_2O$ (30° C.) at a temperature of 30° C. on the silica.

$$\eta_{rel}\text{-}H_2O(30°\text{ C.})=\eta_{rel}/\text{N—}H_2O(30°\text{ C.})$$

where the monolayer capacity N—$H_2O$ (30° C.), as described above, is determined at a temperature of 30° C., where the thickening action $\eta_{rel}$ or relative viscosity $\eta_{rel}$, as described below, has a relative viscosity in a polydimethylsiloxane with a viscosity of 1 Pas at 25° C. $\eta_{rel}^{PDMS-1000}$.

The liquids used to determined the relative viscosity or thickening action $\eta_{rel}$ of the particles, preferably silicas, more preferably fumed silicas, and the relative viscosity $\eta_{rel}$ of particle-filled liquid, may preferably be oligomeric or polymeric resins in organic solvents, for example unsaturated polyester resins such as cocondensates of ortho- or meta-phthalic acid and maleic acid or fumaric acid, or anhydrides thereof, and a low molecular weight diol, for example ethylene glycol, 1,2- or 1,3-propanediol, 1,2- or 1,3- or 1,4-butanediol or neopentyl glycol (($CH_3$)$_2$C($CH_2OH$)$_2$), or polyols such as pentaerythritol, preferably dissolved to an extent of from 30 to 80% by weight, preferably from 60 to 70% by weight, in an olefinic reactive diluent as a solvent, for example monostyrene.

In another preferred embodiment, it is possible to use polydimethylsiloxanes having a viscosity of preferably 100-10,000 mPas at 25° C., more preferably from 900 to 1100 mPas, and in a preferred embodiment linear polydimethylsiloxanes which have been end-capped with trimethylsiloxy groups to an extent of greater than 95% by weight, more preferably greater than 98% by weight. The thickening action of the silica in the liquid system is preferably determined at a temperature of from 10° C. to 60° C., more preferably at from 24.9° C. to 25.1° C.

The thickening action of the silica in the liquid system is preferably assessed in all steps, such as the preparation and performance, i.e. the storage of the raw materials such as silica and the liquids, the transfer and weighing of the raw materials such as silica and the liquids, and the dispersion of the silica, and also the analysis of the silica-in-liquid system mixture, at a precisely defined air humidity which is kept constant, preferably with a variation of the relative air humidity of less than 5% absolute, more preferably at from 10 to 90% relative humidity, most preferably at from 49% to 51% relative humidity.

The silica is dispersed in the liquid system preferably with tools which generate a high mixing action and at the same time a high shear action, for example high-speed toothed disk dissolvers with a peripheral speed of preferably 1-10 m/s, preferably 3-7 m/s. The thickening action or relative viscosity $\eta_{rel}$ is preferably determined as the thickening action $\eta_{rel}^{PDMS-1000}$ in a polydimethylsiloxane having a viscosity of 1000 mPas.

The thickening action or relative viscosity $\eta_{rel}^{PDMS-1000}$ can preferably be determined as follows.

2% by weight of the silicas are first dispersed in by hand with a spoon, and then over 5 min with gentle cooling and blanketing with nitrogen of relative humidity 50% at 25° C. by means of a toothed-disk dissolver with a toothed disk diameter of 5 cm and peripheral outer rotational speed of 11 m/s, corresponding to a rotational speed of 5600 revolutions per minute, into a trimethylsiloxy-end-capped polydimethylsiloxane having a viscosity of 1000 Pas plus or minus 0.05 Pas, and, after heat treatment at 25° C. for 5 minutes, with a tolerance of plus or minus 0.1° C., analyzed with a cone-and-plate viscometer at a shear rate D of $D=10\ s^{-1}$. The resulting viscosity value with silica divided by the viscosity which results in the same measurement setup without silica, gives rise to $\eta_{rel}^{PDMS-1000}$.

The particles, more preferably fumed silica, preferably have on their surface regions which have a density of surface silanol groups SiOH greater than the mean density of surface silanol groups SiOH of the total surface area. These silanol group-rich regions may, for example, be measured by adsorption of water, for example as described above by inverse gas chromatography, for example by measuring the monolayer capacity of water of the fumed silica. The particles, more preferably fumed silica, preferably have on their surface regions which have a density of surface silanol groups SiOH less than the mean density of surface silanol groups SiOH of the total surface area. These low-silanol group regions may, for example, be measured by adsorption of methylene chloride, for example in an analogous manner to that described above for water, by inverse gas chromatography, for example by measuring the monolayer capacity of methylene chloride of the fumed silica.

In a preferred embodiment, the regions relatively rich in surface silanol groups and the regions relatively poor in surface silanol groups together form the total silica surface and area.

Preference is given to particles, more preferably fumed silica, most preferably hydrophilic fumed silica, which have on their surface regions which have a density of surface silanol groups SiOH greater than the mean density of surface silanol groups SiOH of the total surface area, and these regions relatively rich in surface silanol groups have a mean diameter of greater than 1 nm per 100 $m^2$/g of specific surface area, even more referably a mean diameter of greater than 2 nm per 100 $m^2$/g of specific surface area, especially a mean diameter of greater than 2.5 nm per 100 $m^2$/g of specific surface area, the specific surface area preferably being measured by the BET method to DIN 66131 and 66132.

In a preferred embodiment, correspondingly, fumed silica, more preferably hydrophilic fumed silica, with a specific surface area of 100 $m^2$/g preferably has regions relatively rich in surface silanol groups with a mean diameter of greater than 1 nm, even more preferably with a mean diameter of greater than 2 nm, especially preferably with a mean diameter of greater than 2.5 nm.

In a further preferred embodiment, correspondingly, fumed silica, preferably hydrophilic fumed silica, having a specific surface area of 200 $m^2$/g has regions relatively rich in surface silanol groups having a mean diameter of greater than 2 nm, more preferably having a mean diameter of greater than 4 nm, especially preferably having a mean diameter of greater than 5 nm.

In a preferred embodiment, correspondingly, fumed silica having a specific surface area of 300 m2/g has regions relatively rich in surface silanol groups having a mean diameter of greater than 3 nm, even more preferably having a mean diameter of greater than 6 nm, and especially having a mean diameter of greater than 7.5 nm.

The size of the regions relatively rich in surface silanol groups is determined as follows from the specific surface areas of the silica measured with water $S_{BET}(H_2O)$ and measured with methylene chloride $S_{BET}(CH_2Cl_2)$, which add up to give the total surface area $S_{total}$ for every n-th monolayer.

$$S_{BET}(H_2O)+S_{BET}(CH_2Cl_2)=S_{total}$$

$$S^{H_2O}(n)+S_{BET}^{CH_2Cl_2}(n)=S_{total}$$

where $$S^{H_2O}(1)=S_{BET}(H_2O) \text{ and } S_{BET}^{CH_2Cl_2}(1)=S_{BET}(CH_2Cl_2)$$

For every n-th monolayer where n>0:

$$S^{H_2O}(n)=\pi.N(r+n.dr)^2$$

where N is the number of regions rich in silanol groups, r is the mean radius of the regions rich in silanol groups and dr is the size of a water molecule
where:

$$N = \frac{S_{BET}(H_2O)}{\pi(r+dr)^2} \text{ and } S^{CH_2Cl_2}(n) = S_{Total} - S^{H_2O}(n)$$

gives rise to $$\sqrt{\frac{S_{Total}-S^{CH_2Cl_2}(n)}{S_{BET}(H_2O)}} = 1+(n-1)\frac{dr}{r+dr}$$

Linear plotting of $$\sqrt{\frac{S_{Total}-S^{CH_2Cl_2}(n)}{S_{BET}(H_2O)}}$$

as a function of the number of monolayers n gives rise to a straight line. The slope of this straight line and the radius of the regions rich in silanol groups are in the following relationship $$r = \frac{dr}{\text{slope}} - dr$$

According to the invention, particles, preferably silica, more preferably fumed silica, most preferably hydrophilic fumed silica, have a water absorption of less than or equal to 1.0 percent by weight, preferably less than or equal to 0.8 percent by weight, more preferably less than or equal to 0.6 percent by weight, even more preferably less than or equal to 0.4 percent by weight, after a storage of more than one day, preferably after 2 days, more preferably after 3 days, at a temperature of greater than or equal to 20° C., preferably at 23° C., and a relative air humidity of greater than or equal to 90%, preferably greater than or equal to 94%, more preferably greater than or equal to 98%, per 100 m$^2$/g of specific surface area. Where the specific surface area is, for example, a specific BET surface area which can be measured by known processes, preferably to German Industrial Standard DIN 66131 and DIN 66132.

According to the invention, the inventive particles, preferably inventive silica, are used as a thickener for 1-component and 2-component silicone sealants and rubbers crosslinkable at room temperature with ingress of moisture, and also 1-component and 2-component polyurethane coating materials, adhesives and sealants crosslinkable at room temperature with ingress of moisture.

According to the invention, the inventive particles, preferably inventive silica, are used as a reinforcing filler for 1-component and 2-component silicone sealants and rubbers crosslinkable at room temperature with ingress of moisture, and also 1-component and 2-component polyurethane coating materials, adhesives and sealants crosslinkable at room temperature with ingress of moisture.

According to the invention, the inventive particles, preferably inventive silicas, more preferably inventive fumed silicas, are used as a thickener and reinforcing filler in preferably moisture-sensitive coating systems such as paint systems, paints, inks, varnishes or printing inks, for automobiles, modes of transport, constructions, internal fittings, facades, for furniture, wall paints, wood paints, in building protection, and as a thickener and reinforcing filler in preferably moisture-sensitive adhesive systems, such as in the automobile industry, the construction industry, industrial manufacture, and as a thickener and reinforcing filler in preferably moisture-sensitive sealant systems, such as for building windows and automotive glazing, sanitary applications, in the automotive and construction sector, and as a thickener and reinforcing filler in preferably moisture-sensitive elastomer and rubber systems, and as a flow aid in preferably moisture-sensitive powders and pulverulent systems, such as firefighting powder, powder coatings and toners, and also, for example as a raw material, for the production of preferably moisture-sensitive heat-insulating materials, moldings and components, and as a flow aid for powders and pulverulent systems, as a raw material for heat insulation, and as a polishing medium in applications for chemical and mechanical polishing and planarizing, for example in the electronics industry, the semiconductor industry or in the production of optical components.

The fumed silica is produced at high temperature by the action of an evaporable silicon compound, preferably of a silane, in a hydrogen-oxygen flame at temperatures of greater than 1000° C. and up to a maximum of 2000° C.

The silane used is preferably
silane of the formula $H_xSiR_yCl_z$
where, x+y+z=4 and, preferably, R is a methyl or ethyl or propyl group, preferably a methyl group.

Examples of silanes are tetrachlorosilane, methyltri-chlorosilane, hydrotrichlorosilane, hydromethyl-dichlorosilane, tetramethoxysilane, tetraethoxysilane, hexamethyldisiloxane or any mixtures thereof. Preferred examples of silanes are tetrachlorosilane and hydrotrichlorosilane and mixtures thereof.

Preference is given to silane mixtures having a content of greater than 80% by volume of tetrachlorosilane, more preferably greater than 90% by volume of tetrachlorosilane, even more preferably greater than 95% by volume, and most preferably greater than 99% by volume of tetrachlorosilane.

In another preferred embodiment, preference is given to mixtures of silanes which contain a total of greater than 80% by volume, preferably greater than 90% by volume, even more preferably greater than 95% by volume of tetrachlorosilane and hydrotrichlorosilane.

In another preferred embodiment, preference is given to mixtures of silanes which contain a total of greater than or equal to 10% by volume, preferably greater than or equal to 25% by volume and even more preferably greater than or equal to 50% by volume of hydro-trichlorosilane, and preferably greater than or equal to 45% by volume of tetrachlorosilane.

Silanes can be added to the reactor preferably by premixing the silanes in liquid form and then evaporating them in order then to add them, or the silanes can each be evaporated alone and then mixed in vapor form in order then to be added. Addition is also possible by adding each silane separately in vapor form, in which case the silanes are, however, added simultaneously. Preference is given to premixing the silanes in liquid form and then evaporating them in order then to be added; more preferably, the silanes are each evaporated alone and then mixed in vapor form in order then to be added.

Preference is given to producing the inventive fumed silica under conditions which achieve highly uniform radial temperature distribution in the flame. A highly uniform radial temperature distribution in the flame can be effected through geometric construction measures or suitable chemical formulation control.

To produce inventive fumed silica, preference is given to adding, for 100 kg/h of silanes, greater than 800 m$^3$ (STP)/h of air, more preferably greater than or equal to 1000 m$^3$ (STP)/h of air, most preferably greater than or equal to 1200 m$^3$ (STP)/h of air. Preference is given to a ratio of the volume of hydrogen gas used, based on the volume of oxygen gas used, of less than or equal to 0.26, more preferably less than or equal to 0.24, even more preferably less than or equal to 0.21, and especially less than or equal to 0.19.

After reaction, the silica is separated from process gas. This is preferably effected by means of filters, and it is subsequently purified to free it of residual hydrogen chloride gas, which is effected preferably in a hot gas stream; preferred gases are air or nitrogen at temperatures of preferably greater than 250° C.-600° C., more preferably 350° C.-550° C. and most preferably 350° C.-450° C.

Preference is given to producing the fumed silica under anhydrous conditions. In this context, anhydrous is understood to mean that neither in the hydrothermal preparation process nor in the further steps of the process, such as cooling, purification and storage, up the finished and purified, packaged and ready-to-ship product is additional water supplied into the process, either in liquid or in vaporous form. No additional water means here that no additional water other than the water which arises and is present through the reaction of hydrogen and any other hydrogen-containing combustion gases and oxygen in the reactor, in the flame and in the production system.

All combustion gases, preferably hydrogen, any other combustion gases such as alkanes which are gaseous at standard pressure, for example methane, ethane or propane, preferably methane, and also air or oxygen, preferably air, which may be predried, for example, by freezing, and silane or silane mixtures, can be added separately or after preceding mixing of all gas streams or of partial gas streams. Preceding mixing of the gases and silanes is preferred.

Preference is given to subsequently cooling the process mixture and subsequently removing the solid products and the gases, preferably by filtration.

Preference is given to purifying the solid products to free them of adsorbed hydrogen chloride gas HCl by treating them at elevated temperature and preferably adding purifying gas to remove the HCl.

Preference is given to homogenizing the resulting product by blowing in preferably dried air or by mechanical mixing, such as stirring or pumped circulation.

The liquid feedstocks can be evaporated preferably by heat transfer by means of a heat exchanger or by lowering the boiling point by applying a vacuum. The gases and vapors can be mixed either within the reactor or outside the reactor, preferably outside.

The gases and the fumed silica can be cooled by blowing in additional gases, for example nitrogen, or through heat exchangers; preference is given to heat exchangers.

The fumed silica can be removed from the gaseous reaction constituents either by deposition, preferably cyclone deposition, or by filtration on a porous filter material, preferably filter fabric.

The solid constituents are purified by heat treatment, preferably by means of hot gases, preferably hot air or nitrogen, preferably in a fluidized bed.

The particles, preferably silica, more preferably fumed silica, may be surface-treated or subsequently surface-modified, for example by silylation with organosilicon compounds.

In addition, it is possible to use, with or without silylation, processes for mechanically compacting the particles, preferably silica, preferably fumed silica, for example pressure rollers, ball mills, edge-runner mills, screw compressors and briquetters.

In addition, with or without silylation, it is possible to use processes for deagglomerating the particles, preferably silica, preferably fumed silica, such as pinned-disk mills or apparatus for grinding and classifying and/or processes for mechanically compacting the silica, for example pressure rollers, or compacting by removing the air or gas contents with suction by suitable vacuum methods or other processes for mechanical compaction, for example pressure rollers, ball mills, edge-runner mills, screw compressors and briquetters.

EXAMPLES

Example 1

100 kg/h of silicon tetrachloride are converted in a reactor chamber mixed homogeneously in a flame of 1429 m$^3$ (STP)/h of air and 357 m$^3$ (STP)/h of hydrogen gas. The gas mixture reacts at approx. 1600° C. After leaving the combustion chamber, the silica gas mixture formed is cooled in a heat exchange system to approx. 200° C., and then the solid silica is separated from the hydrogen chloride-containing gas phase in a filter system. Subsequently, residues of hydrogen chloride are removed at elevated temperature by supplying air heated via the combustion of natural gas without further addition of water or moisture. A fumed silica having a specific surface area, measured by the BET method to DIN 66131 and 66132, of 50 m$^2$/g is obtained, with a pH of the 4% (% by weight) dispersion (DIN/ISO 787/9) of 4.3. Further physico-chemical data are listed in Tables 1a, 1b and 1c.

Example 2

100 kg/h of silicon tetrachloride are converted in a reactor chamber mixed homogeneously in a flame of 822 m$^3$ (STP)/h of air and 178 m$^3$ (STP)/h of hydrogen gas. The gas mixture reacts at approx. 1600° C. After leaving the combustion chamber, the silica gas mixture formed is cooled in a heat exchange system to approx. 200° C., and then the solid silica is separated from the hydrogen chloride-containing gas phase in a filter system. Subsequently, residues of hydrogen chloride are removed at elevated temperature by supplying air heated via the combustion of natural gas without further addition of water or moisture. A fumed silica having a specific surface area, measured by the BET method to DIN 66131 and 66132, of 125 m$^2$/g is obtained, with a pH of the 4% (% by weight) dispersion (DIN/ISO 787/9) of 4.2. Further physico-chemical data are listed in Tables 1a, 1b and 1c.

The silica is subsequently stored at a temperature of 25° C. and at a relative air humidity of 94 percent in a closed room. The silica absorbs 3.8 percent of water after a total of 0.5 day, 4.2 percent of water after a total of 1 day, 5.1 percent of water after a total of 2 days and 6.2 percent of water after a total of 5 days. The water absorption is determined by the weight increase.

Example 3

100 kg/h of silicon tetrachloride are converted in a reactor chamber mixed homogeneously in a flame of 1162 m$^3$ (STP)/h of air and 243 m$^3$ (STP)/h of hydrogen gas. The gas mixture reacts at approx. 1600° C. After leaving the combustion chamber, the silica gas mixture formed is cooled in a heat exchange system to approx. 200° C., and then the solid silica is separated from the hydrogen chloride-containing gas phase in a filter system. Subsequently, residues of hydrogen chloride are removed at elevated temperature by supplying air heated via the combustion of natural gas without further addition of water or moisture. A fumed silica having a specific surface area, measured by the BET method to DIN 66131 and 66132, of 300 m$^2$/g is obtained, with a pH of the 4% (% by weight) dispersion (DIN/ISO 787/9) of 4.1. Further physico-chemical data are listed in Tables 1a, 1b and 1c.

Example 4

100 kg/h of silicon tetrachloride are converted in a reactor chamber mixed homogeneously in a flame of 1321 m$^3$ (STP)/h of air and 237 m$^3$ (STP)/h of hydrogen gas. The gas mixture reacts at approx. 1600° C. After leaving the combustion chamber, the silica gas mixture formed is cooled in a heat exchange system to approx. 200° C., and then the solid silica is separated from the hydrogen chloride-containing gas phase in a filter system. Subsequently, residues of hydrogen chloride are removed at elevated temperature by supplying air heated via the combustion of natural gas without further addition of water or moisture. A fumed silica having a specific surface area, measured by the BET method to DIN 66131 and 66132, of 100 m²/g is obtained, with a pH of the 4% (% by weight) dispersion (DIN/ISO 787/9) of 4.2. Further physicochemical data are listed in Tables 1a, 1b and 1c.

The silica is subsequently stored at a temperature of 25° C. and at a relative air humidity of 94 percent in a closed room. The silica absorbs 2.2 percent of water after a total of 0.5 day, 2.4 percent of water after a total of 1 day, 2.7 percent of water after a total of 2 days and 3.1 percent of water after a total of 5 days.

The water absorption is determined by the weight increase.

Example 5

50 kg/h of tetrachlorosilane and 50 kg/h of hydrotrichlorosilane are converted in a reactor chamber mixed homogeneously in a flame of 822 m³ (STP)/h of air and 178 m³ (STP)/h of hydrogen gas. The gas mixture reacts at approx. 1600° C. After leaving the combustion chamber, the silica gas mixture formed is cooled in a heat exchange system to approx. 200° C., and then the solid silica is separated from the hydrogen chloride-containing gas phase in a filter system. Subsequently, residues of hydrogen chloride are removed at elevated temperature by supplying air heated via the combustion of natural gas without further addition of water or moisture. A fumed silica having a specific surface area, measured by the BET method to DIN 66131 and 66132, of 125 m²/g is obtained, with a pH of the 4% (% by weight) dispersion (DIN/ISO 787/9) of 4.2. Further physicochemical data are listed in Tables 1a, 1b and 1c.

The silica is subsequently stored at a temperature of 25° C. and at a relative air humidity of 94 percent in a closed room. The silica absorbs 3.1 percent of water after a total of 0.5 day, 3.4 percent of water after a total of 1 day, 4.1 percent of water after a total of 2 days and 5.0 percent of water after a total of 5 days. The water absorption is determined by the weight increase.

TABLE 1c

Evaluation of Examples 1 to 5

| Example | $\eta_{rel}$-spec-H$_2$O (30° C.) m²/μmol | Q-equil-H$_2$O % by wt. | Q-equil-H$_2$O per 100 m²/g % by wt. |
|---|---|---|---|
| Example 1 | 0.73 | 3.2 | 0.065 |
| Example 2 | 0.88 | 8.0 | 0.064 |
| Example 3 | 1.35 | 20.4 | 0.068 |
| Example 4 | 1.51 | 3.9 | 0.039 |
| Example 5 | 1.21 | 7.1 | 0.057 |

$\eta_{rel}^{PDMS-1000}$: relative viscosity or thickening action of 2 percent by weight of silica measured at a shear rate of 10 1/s and at a temperature of 25° C. in a polydimethylsiloxane having a viscosity of 1000 mPas at 25° C.
ε: porosity
N—H$_2$O (40° C.): mass-specific water absorption, determined as the monolayer capacity for water at a temperature of 40° C.
η-SF: surface-specific thickening action, determined as the relative thickening action $\eta_{rel}^{PDMS-1000}$ divided by the specific surface area measured by the BET method to DIN 66131 and 66132
$\eta_{rel}$-H$_2$O (40° C.): water absorption-specific thickening action, determined as the relative thickening action $\eta_{rel}^{PDMS-1000}$ divided by the monolayer capacity for water at 40° C.
b-PP: surface-specific primary particle diameter distribution
SiOH/nm²: density of surface silanol groups SiOH, based on the specific surface area, measured by the BET method to DIN 66131 and 66132
S-BET-N$_2$: specific BET surface area according to German Industrial Standard DIN 66131 and DIN 66132
N-spec-H$_2$O (40° C.): surface-specific water absorption, determined as the quotient of the monolayer capacity for water N—H$_2$O at a temperature of 40° C. divided by the specific BET surface area.
N—H$_2$O (30° C.): mass-specific water absorption, determined as the monolayer capacity for water at a temperature of 30° C.
N-spec-H$_2$O (30° C.): surface-specific water absorption, determined as the quotient of the monolayer capacity for water N—H$_2$O at a temperature of 30° C. divided by the specific BET surface area.
$\eta_{rel}$-spec-H$_2$O (30° C.): water absorption-specific thickening action, determined as the relative thickening action $\eta_{rel}^{PDMS-1000}$ divided by the surface-specific water absorption at 30° C.
$\eta_{rel}$-H$_2$O (30° C.): water absorption-based thickening action, determined as the relative thickening action $\eta_{rel}^{PDMS-1000}$ divided by the monolayer capacity for water at 30° C.
R(SiOH): diameter of the domains rich in silanol groups, determined by means of inverse gas chromatography at a temperature of 30° C. and desorption of methylene chloride (1) in the absence of water, (2) at steam pressure corresponding to one monolayer of water, (3) at steam pressure corresponding to two monolayers of water and (4) at steam pressure corresponding to three monolayers of water
Q-equil-H$_2$O: water absorption in percent by weight after storage at a temperature of 23° C. and a relative air humidity of 98% for three days

The invention claimed is:

1. Non-silylated fumed silica particles having a thickening action $\eta_{rel}$ greater than 3.5, when measured in liquid polydimethylsiloxane with a viscosity of 1 Pas at a temperature of 25° C. and measured at a shear rate of 10 s$^{-1}$, and which, in dry TABLE 1a Evaluation of Examples 1 to 5

| Example | $\eta_{rel}^{PDMS-1000}$ | ε | μmol/g N—H$_2$O (40° C.) | g/m² $\eta_{rel}$-SF | g/μmol $\eta_{rel}$-H$_2$O (40° C.) | b-PP | SiOH/nm² |
|---|---|---|---|---|---|---|---|
| Example 1 | 2.3 | 0.96 | 227 | 0.046 | 0.0101 | 3.5 | 1.7 |
| Example 2 | 3.7 | 0.97 | 588 | 0.030 | 0.0063 | 4.5 | 1.7 |
| Example 3 | 7.3 | 0.97 | 1650 | 0.024 | 0.0044 | 5 | 1.8 |
| Example 4 | 3.6 | 0.97 | 450 | 0.036 | 0.0080 | 3.5 | 1.6 |
| Example 5 | 3.9 | 0.97 | — | 0.031 | — | 3.2 | 1.7 |

TABLE 1b

Evaluation of Examples 1 to 5

| Example | S-BET-N$_2$ m²/g | N-spec-H$_2$O (40° C.) μmol/m² | N—H$_2$O (30° C.) μmol/g | N-spec-H$_2$O (30° C.) μmol/m² | $\eta_{rel}$-H$_2$O (30° C.) g/μmol | R(SiOH) nm |
|---|---|---|---|---|---|---|
| Example 1 | 50 | 4.5 | 157 | 3.1 | 0.0146 | 1.4 |
| Example 2 | 125 | 4.7 | 528 | 4.2 | 0.0070 | 1.9 |
| Example 3 | 300 | 5.5 | 1626 | 5.4 | 0.0045 | 4.2 |
| Example 4 | 100 | 4.5 | 238 | 2.4 | 0.0151 | 3.8 |
| Example 5 | 125 | — | 403 | 3.2 | 0.0097 | 2.8 | form, are capable of forming accumulations with a porosity $\epsilon$ of >0.5, the fumed silica particles prepared by the reaction of a mixture of silanes comprising tetrachlorosilane and hydrotrichlorosilane in a hydrogen-oxygen flame at temperatures of greater than 1000° C. and up to a maximum of 2000° C. with the proviso that the fumed silica particles are produced under anhydrous conditions and following the reaction, the fumed silica particles are separated from process gas and subsequently purified to free them of residual hydrogen chloride gas, which is effected in a hot gas stream, at temperatures of $\geqq$250° C. to 600° C.

2. The non-silylated fumed silica particles of claim 1, which have a thickening action $\eta_{rel}$ greater than 5.

3. The non-silylated fumed silica particles of claim 2, which have a thickening action $\eta_{rel}$ greater than 7.5.

4. The non-silylated fumed silica particles of claim 3, which have a surface-specific water absorption of less than 5 $\mu mol/m^2$.

5. The non-silylated fumed silica particles of claim 3, wherein the fumed silica has a surface-specific thickening action of greater than 0.01 gram per square meter, where the surface-specific thickening action is defined as the quotient of the thickening action in a liquid system and the specific surface area of the particles.

6. The non-silylated fumed silica particles of claim 3, wherein the fumed silica has a water absorption-specific thickening action of greater than 0.02 square meter per micromole where the water absorption-specific thickening action is defined as the quotient of the thickening action and the specific water absorption of the fumed silica.

7. The non-silylated fumed silica particles of claim 3, wherein the fumed silica has a thickening action based on water absorption of greater than 0.004 gram per micromole, where the thickening action based on the water absorption is defined as the quotient of the thickening action and of the monolayer capacity of water on the fumed silica.

8. The non-silylated fumed silica particles of claim 3, wherein the fumed silica has a surface-specific primary particle diameter distribution of less than 6.

9. The non-silylated fumed silica particles of claim 3, wherein the fumed silica has a density of surface silanol groups SiOH of less than 2.5 $SiOH/nm^2$.

10. The non-silylated fumed silica particles of claim 3, wherein the fumed silica has regions on its surface which have a density of surface silanol groups SiOH greater than the mean density of surface silanol SiOH of the total surface area, and wherein the fumed silica has regions on its surface which have a density of surface silanol groups SiOH less than the mean density of surface silanol groups SiOH of the overall surfaces.

11. The non-silylated fumed silica particles of claim 3, wherein the fumed silica has regions on its surface which have a density of surface silanol groups SiOH greater than the mean density of surface silanol groups SiOH of the total surface area, and wherein these surface silanol group-rich regions have a mean diameter of greater than 1 nm per 100 $m^2/g$ of specific surface area.

12. The non-silylated fumed silica particles of claim 3, wherein the fumed silica has a water absorption of less than or equal to one percent by weight after storage for more than one day at a temperature of greater than or equal to 20° C. and a relative humidity of greater than or equal to 90%, per 100 $m^2/g$ of specific surface area.

13. The non-silylated fumed silica particles of claim 3, wherein $\epsilon$>0.8.

14. The non-silylated fumed silica particles of claim 3, wherein the mixture of silanes contains greater than or equal to 10% by volume of hydrotrichlorosilane and greater than or equal to 45% by volume of tetrachlorosilane.

15. The non-silylated fumed silica particles of claim 2, wherein $\epsilon$>0.8.

16. The non-silylated fumed silica particles of claim 2, wherein the mixture of silanes comprises greater than 80 volume percent of tetrachlorosilane and trichlorosilane.

17. The non-silylated fumed silica particles of claim 16, wherein the mixture of silanes contains greater than or equal to 10% by volume of hydrotrichlorosilane and greater than or equal to 45% by volume of tetrachlorosilane.

18. The non-silylated fumed silica particles of claim 1, wherein $\epsilon$>0.8.

19. The non-silylated fumed silica particles of claim 1, wherein a volume ratio of hydrogen gas to oxygen gas in the hydrogen-oxygen flame is less than or equal to 0.26.

20. A filler for 1-component and 2-component silicone materials crosslinkable at room temperature with ingress of moisture, crosslinkable silicone sealants and polyurethane coatings, adhesives and sealants, comprising the non-silylated fumed silica particles of claim 1.

21. A raw material for heat insulation, comprising the non-silylated fumed silica particles of claim 1.

* * * * *